UNITED STATES PATENT OFFICE.

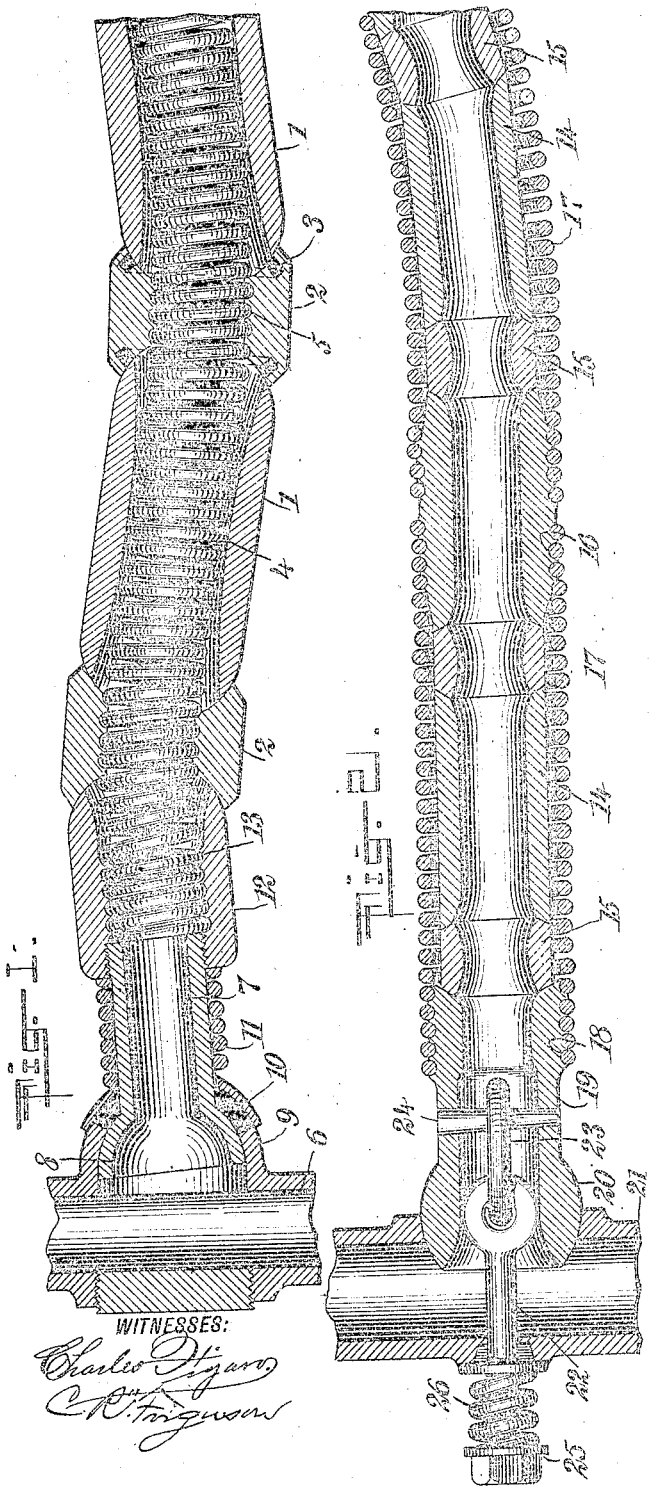

GUSTAF M. ANDERSSON, OF HYDE PARK, MASSACHUSETTS, ASSIGNOR OF ONE-HALF TO FRANK H. KASPERSON, OF HYDE PARK, MASSACHUSETTS.

FLEXIBLE TUBING.

No. 832,523.     Specification of Letters Patent.     Patented Oct. 2, 1906.

Application filed September 1, 1904. Serial No. 222,970.

*To all whom it may concern:*

Be it known that I, GUSTAF M. ANDERSSON, a citizen of the United States, and a resident of Hyde Park, in the county of Norfolk and State of Massachusetts, have invented a new and Improved Flexible Tubing, of which the following is a full, clear, and exact description.

This invention relates to improvements in flexible metal tubing and couplings therefor, the object being to provide a tubing comprising a plurality of sections or joints flexibly held together by means of a spiral spring the coils of which engage in spiral channels formed in certain of the sections or joints, whereby longitudinal pressure is exerted to hold the ends of the sections or joints closely together.

I will describe a flexible tubing embodying my invention and then point out the novel features in the appended claims.

Reference is to be had to the accompanying drawings, forming a part of this specification, in which similar characters of reference indicate corresponding parts in both figures.

Figure 1 is a longitudinal section of a flexible tubing embodying my invention. Fig. 2 is a longitudinal section showing a modification.

Referring first to the example of my improvement shown in Fig. 1, the flexible tubing comprises long tubular sections 1, alternating with short tubular sections 2. The sections 1 are rounded or convexed at the end, and these ends are seated in the concaved ends of the short sections, thus permitting the sections to swing freely in all directions. These sections may be made of any suitable material—such, for instance, as metal—and, if desired, packing rings 3 may be arranged between the joints of the sections. The coiled spring 4 extends through the tubular sections, and the short sections 2 are provided with interior spirally-disposed channels 5, which receive coils of the spring, causing an interlock between the parts, and obviously by turning the short sections on the spiral spring the joint connections between the several sections may be tightened.

I have shown a coupling-section between the flexible tubing and a pipe 6. This joint consists of a tube 7, having a hemispherical portion 8 engaging in a correspondingly-shaped cup 9 on the pipe 6. Surrounding the tube 7 and engaging with the outer surface of the cup 9 is a concaved washer 10, which is pressed tightly against said portion 9, and consequently draws the parts 8 and 9 together, by means of a spring 11, which abuts against said washer at one end and at the other end against a sleeve 12, having screw-thread engagement with the tube 7 and having its end formed or convexed to engage in the concaved end of a short section of the tubing. This sleeve 12 is provided with an interior spirally-disposed channel 13 for receiving the end coils of the spring.

In Fig. 2 the tubing is formed of long sections 14 and short sections 15, the ends of the sections 14 being concaved to receive the convexed ends of the sections 15. Certain of the long sections at intervals along the tubing are provided with spiral channels 16 to receive the end coils of spiral springs 17, which extend around the outer side of the several sections, these springs serving the same purpose as the spring first described, and by rotating the sections having the channels the joints may be tightened, as before mentioned. The end of one spring 17 has its coils engaged in a spiral channel 18, formed in a coupling-section 19, having a rounded head 20 for engaging the wall of an opening in a pipe 21. The head 20 is held tightly against its seat, but permitted to move, by means of a bolt 22, passing through an opening in the pipe 21 opposite the opening receiving the head 20, and the inner end of this bolt has a link connection 23 with a cross-pin 24 in the coupling-section. Engaging around the bolt at the outer side of the pipe 21 and bearing at one end against said pipe and at the other end against a nut 25 on the bolt is a spring 26.

Having thus described my invention, I claim as new and desire to secure by Letters Patent—

1. A tubing comprising a plurality of sections engaging at the ends one with another, certain of said sections intermediate of the end sections being spirally channeled, and a coiled spring extended along the sections and having coils for engaging in said channels.

2. A flexible tubing comprising a plurality of long sections, short sections between the ends of the long sections, the ends of certain of the sections being concaved while the ends of the other sections are convexed, and a coiled spring having coils interlocking with certain of the sections and holding the ends of the several sections yieldingly together the said interlocking coil portions being intermediate of the end sections.

3. A flexible tubing comprising a plurality of sections engaging end to end, certain of said sections intermediate of the end sections being spirally channeled in the inner side, and a spiral spring extended through the several sections and having coils engaging in said channels.

4. A flexible metal tubing comprising a plurality of sections having abutting ends, and a spring extended along the sections and having coiled portions interlocking with certain of the sections intermediate of the end sections.

In testimony whereof I have signed my name to this specification in the presence of two subscribing witnesses.

GUSTAF M. ANDERSSON.

Witnesses:
CHARLES W. HILLS,
EDWARD G. MACILROY.